United States Patent
Yuan et al.

(10) Patent No.: US 12,323,983 B2
(45) Date of Patent: Jun. 3, 2025

(54) UCI MULTIPLEXING ON PUSCH FOR MULTI-PANEL UPLINK TRANSMISSION

(71) Applicant: QUALCOMM Incorporated, San Diego, CA (US)

(72) Inventors: Fang Yuan, Beijing (CN); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/759,229

(22) PCT Filed: Feb. 5, 2020

(86) PCT No.: PCT/CN2020/074317
§ 371 (c)(1),
(2) Date: Jul. 21, 2022

(87) PCT Pub. No.: WO2021/155502
PCT Pub. Date: Aug. 12, 2021

(65) Prior Publication Data
US 2023/0069053 A1    Mar. 2, 2023

(51) Int. Cl.
*H04W 72/04* (2023.01)
*H04W 72/0446* (2023.01)
(Continued)

(52) U.S. Cl.
CPC ....... *H04W 72/21* (2023.01); *H04W 72/0446* (2013.01); *H04W 72/0453* (2013.01)

(58) Field of Classification Search
CPC ......... H04W 72/0453; H04W 72/0446; H04W 72/21; H04W 72/1268; H04L 5/0053; H04L 5/001; H04L 5/0044
See application file for complete search history.

(56) References Cited

U.S. PATENT DOCUMENTS 11,218,996 B2   1/2022  Wang et al.
12,133,214 B2 * 10/2024  Park ................ H04W 72/566
(Continued)

FOREIGN PATENT DOCUMENTS

CN    110505698 A     11/2019
EP    2541824 A1 *   1/2013  ........... H04L 1/0031
(Continued)

OTHER PUBLICATIONS

Huawei, et al., "Feature Summary of Enhancements on Multi-TRP/Panel Transmission", 3GPP Draft, 3GPP TSG RAN WG1 Meeting #99, R1-1913299, Nov. 18-22, 2019, Nov. 25, 2019 (Nov. 25, 2019), 88 Pages, XP051830596, Retrieved from the Internet: URL: https://ftp.3gpp.org/tsg_ran/WG1_RL1/TSGR1_99/Docs/R1-1913299.zip R1-1913299FLSummary_MTRP_99_v3.docx [Retrieved on Nov. 5, 2019] p. 44-p. 47 Qualcomm input, p. 54 RAN1#96, p. 71-p. 85, Section 4.
(Continued)

*Primary Examiner* — Brian D Nguyen
(74) *Attorney, Agent, or Firm* — Harrity & Harrity, LLP

(57) ABSTRACT

Various aspects of the present disclosure generally relate to wireless communications. In some aspects, a user equipment (UE) may determine that a resource allocation, for a physical uplink control channel (PUCCH) transmission occasion, indicates time domain resources that overlap time domain resources of a first resource allocation for a first physical uplink shared channel (PUSCH) transmission occasion and a second resource allocation for a second PUSCH transmission occasion; and multiplex uplink control information (UCI) associated with the PUCCH transmission occasion on a selected PUSCH transmission occasion, the selected PUSCH transmission occasion comprising at least one of the first PUSCH transmission occasion, the second PUSCH
(Continued)

transmission occasion, or a combination thereof. Numerous other aspects are provided.

37 Claims, 7 Drawing Sheets

(51) Int. Cl.
*H04W 72/0453* (2023.01)
*H04W 72/21* (2023.01)

(56) References Cited

U.S. PATENT DOCUMENTS

| | | | |
|---|---|---|---|
| 2011/0310780 A1* | 12/2011 | Xiao | H04L 1/1861 375/295 |
| 2018/0132264 A1* | 5/2018 | Jung | H04L 1/1854 |
| 2018/0167933 A1* | 6/2018 | Yin | H04L 5/0055 |
| 2019/0349917 A1 | 11/2019 | Huang et al. | |
| 2019/0364561 A1* | 11/2019 | Xiong | H04L 5/0051 |
| 2021/0337569 A1* | 10/2021 | Fu | H04L 5/0053 |
| 2022/0159641 A1* | 5/2022 | Kim | H04L 5/0053 |
| 2023/0069053 A1* | 3/2023 | Yuan | H04W 72/0453 |
| 2024/0049222 A1* | 2/2024 | Fu | H04L 5/0053 |

FOREIGN PATENT DOCUMENTS

| | | |
|---|---|---|
| WO | 2011137408 A2 | 11/2011 |
| WO | 2019195180 A1 | 10/2019 |
| WO | WO-2019213907 A1 | 11/2019 |
| WO | WO-2020006678 A1 | 1/2020 |

OTHER PUBLICATIONS

International Search Report and Written Opinion—PCT/CN2020/074317—ISA/EPO—Oct. 29, 2020.
Panasonic: "On Multi-TRP Enhancements for NR MIMO in Rel. 16," R1-1910523, 3GPP TSG RAN WG1 #98bis, Oct. 14-20, 2019, Oct. 2, 2019 (Oct. 2, 2019) section 2.3, 11 pages.
Supplementary European Search Report—EP20918051—Search Authority—The Hague—Sep. 8, 2023.

* cited by examiner

UCI MULTIPLEXING ON PUSCH FOR MULTI-PANEL UPLINK TRANSMISSION

CROSS-REFERENCE TO RELATED APPLICATION

This Patent Application is a 371 national stage of PCT Application No. PCT/CN2020/074317 filed on Feb. 5, 2020, entitled "UCI MULTIPLEXING ON PUSCH FOR MULTI-PANEL UPLINK TRANSMISSION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink control information (UCI) multiplexing on physical uplink shared channel (PUSCH) for multiple panel ("multi-panel") uplink transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a resource allocation, for a physical uplink control channel (PUCCH) transmission occasion, indicates time domain resources that overlap time domain resources of a first resource allocation for a first physical uplink shared channel (PUSCH) transmission occasion and a second resource allocation for a second PUSCH transmission occasion; and multiplexing uplink control information (UCI) associated with the PUCCH transmission occasion on a selected PUSCH transmission occasion, the selected PUSCH transmission occasion comprising at least one of the first PUSCH transmission occasion, the second PUSCH transmission occasion, or a combination thereof.

In some aspects, a UE for wireless communication may include memory and one or more processors operatively coupled to the memory. The memory and the one or more processors may be configured to determine that a resource allocation, for a PUCCH transmission occasion, indicates time domain resources that overlap time domain resources of a first resource allocation for a first PUSCH transmission occasion and a second resource allocation for a second PUSCH transmission occasion; and multiplex UCI associated with the PUCCH transmission occasion on a selected PUSCH transmission occasion, the selected PUSCH transmission occasion comprising at least one of the first PUSCH transmission occasion, the second PUSCH transmission occasion, or a combination thereof.

In some aspects, a non-transitory computer-readable medium may store one or more instructions for wireless communication. The one or more instructions, when executed by one or more processors of a UE, may cause the one or more processors to: determine that a resource allocation, for a PUCCH transmission occasion, indicates time domain resources that overlap time domain resources of a first resource allocation for a first PUSCH transmission occasion and a second resource allocation for a second PUSCH transmission occasion; and multiplex UCI associated with the PUCCH transmission occasion on a selected PUSCH transmission occasion, the selected PUSCH transmission occasion comprising at least one of the first PUSCH transmission occasion, the second PUSCH transmission occasion, or a combination thereof.

In some aspects, an apparatus for wireless communication may include means for determining that a resource allocation, for a PUCCH transmission occasion, indicates time domain resources that overlap time domain resources of a first resource allocation for a first PUSCH transmission occasion and a second resource allocation for a second PUSCH transmission occasion; and means for multiplexing UCI associated with the PUCCH transmission occasion on a selected PUSCH transmission occasion, the selected PUSCH transmission occasion comprising at least one of the first PUSCH transmission occasion, the second PUSCH transmission occasion, or a combination thereof.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
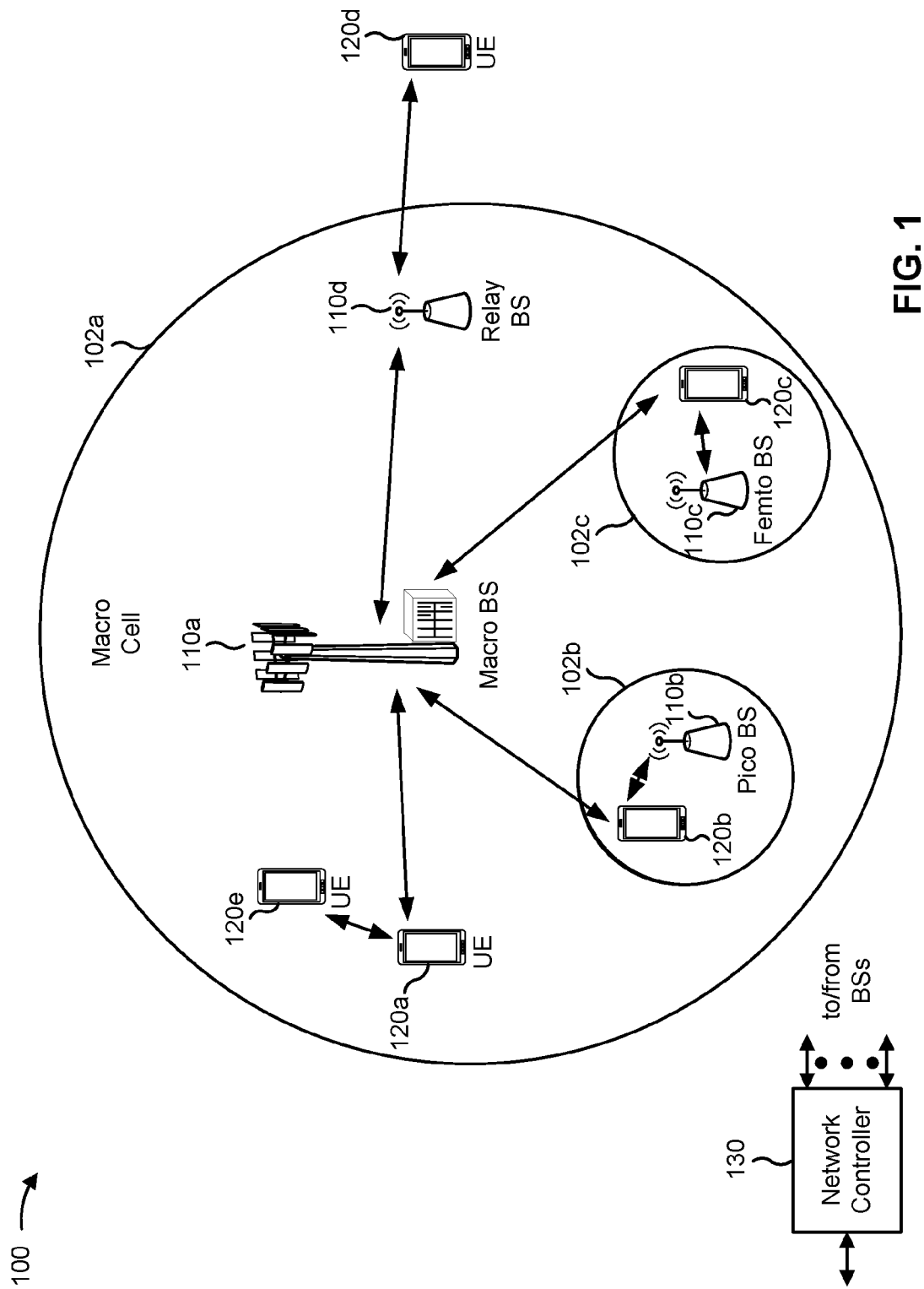
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
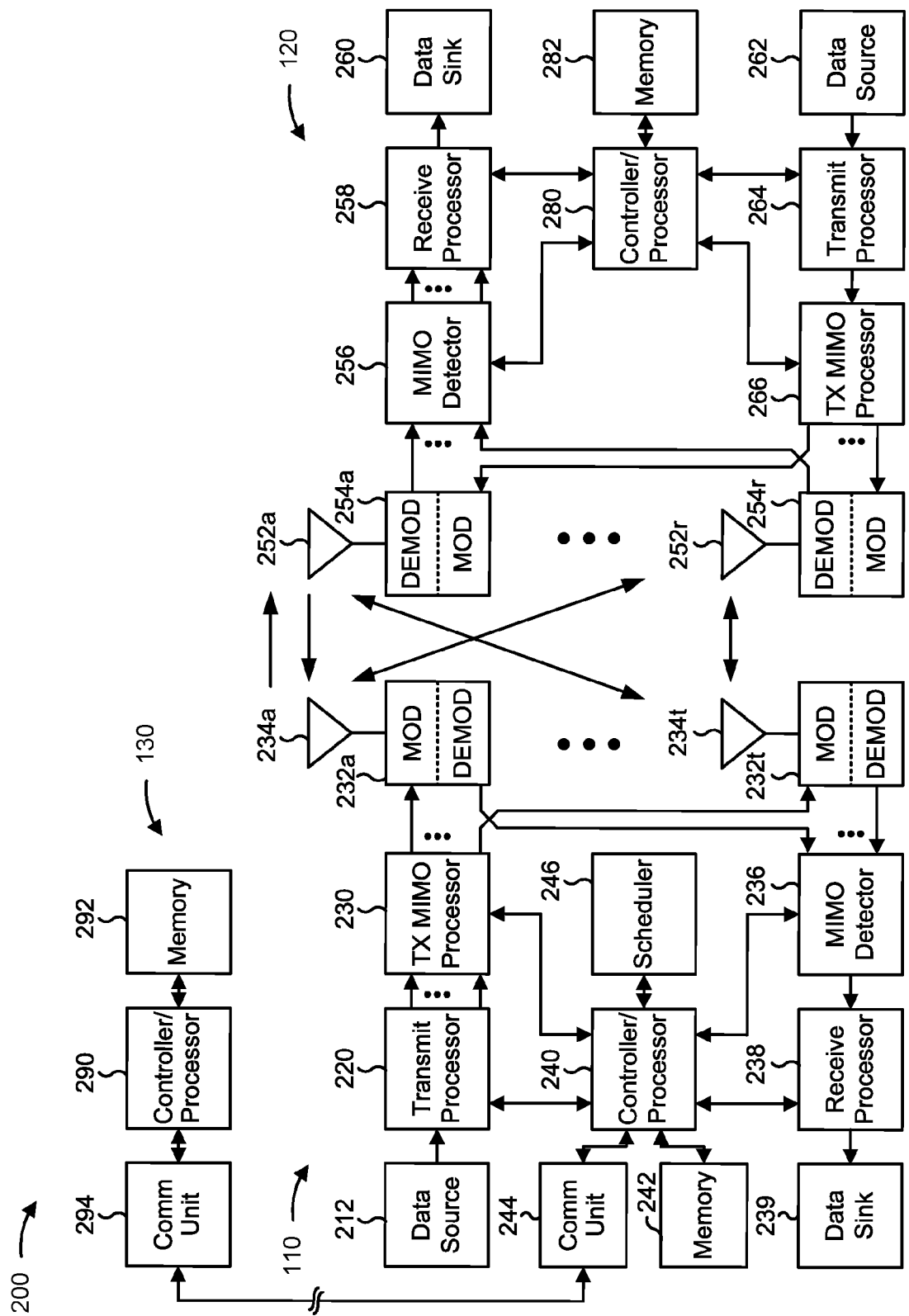
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with uplink control information (UCI) multiplexing on physical uplink shared channel (PUSCH) for multi-panel uplink transmission, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7 and/or other processes as described herein. A scheduler 246 may schedule UEs for data transmission on the downlink and/or uplink.

In some aspects, UE 120 may include means for determining that a resource allocation, for a physical uplink control channel (PUCCH) transmission occasion, indicates time domain resources that overlap time domain resources of a first resource allocation for a first PUSCH transmission occasion and a second resource allocation for a second PUSCH transmission occasion, means for multiplexing UCI associated with the PUCCH transmission occasion on a selected PUSCH transmission occasion, the selected PUSCH transmission occasion comprising at least one of the first PUSCH transmission occasion, the second PUSCH transmission occasion, or a combination thereof, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
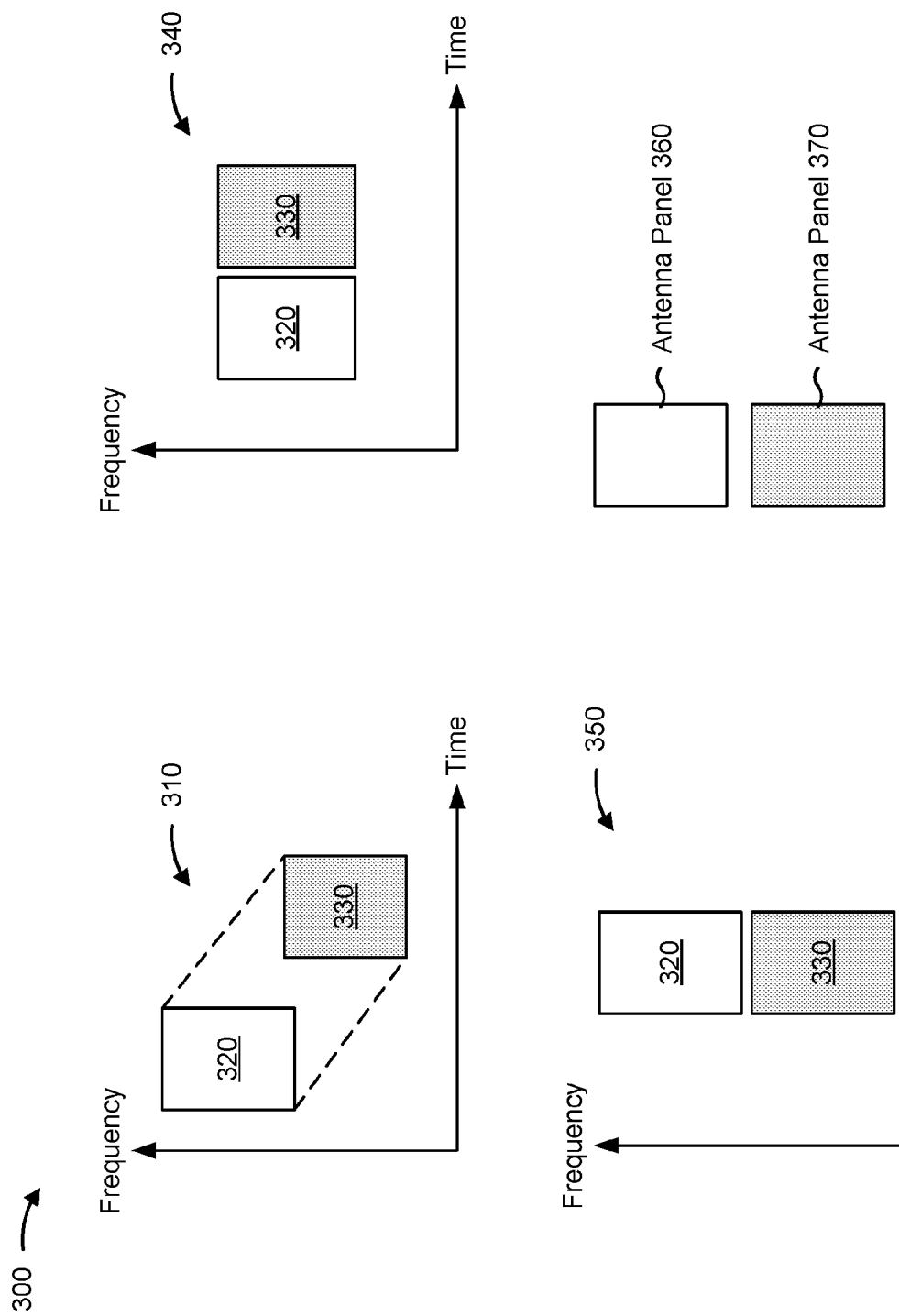
FIG. 3 is a diagram illustrating an example of multi-panel uplink transmission, in accordance with various aspects of the present disclosure.

FIG. 3 is a diagram illustrating an example 300 of multi-panel uplink transmission, in accordance with various aspects of the present disclosure. A UE 120 and a BS 110 may communicate in connection with an uplink multi-panel transmission of the UE 120. The UE 120 may employ multiple transmit antenna panels. The antenna panels may be a group of antenna ports or an antenna group. The uplink multi-panel transmission may be in a spatial-division multiplexed manner, a time-division multiplexed manner, or a frequency-division multiplexed manner.

FIG. 3 shows a spatial-division multiplexing (SDM) 310 of a first PUSCH transmission occasion 320 and a second PUSCH transmission occasion 330, a time-division multiplexing (TDM) 340 of the PUSCH transmission occasions 320 and 330, and a frequency-division multiplexing (FDM) 350 of the PUSCH transmission occasions 320 and 330.

According to the SDM 310 (e.g., non-coherent joint transmission), the UE 120 may transmit the first PUSCH transmission occasion 320 (shown as a first layer) and the second PUSCH transmission occasion 330 (shown as a second layer superimposed over the first layer) in a same time and frequency resource, but different spatial resources. According to the TDM 340, the UE 120 may transmit the first PUSCH transmission occasion 320 and the second PUSCH transmission occasion 330 in a same frequency resource and different time resources. According to FDM 350, the UE 120 may transmit the first PUSCH transmission occasion 320 and the second PUSCH transmission occasion 330 in the same time resource and different frequency resources.

In some aspects, the UE 120 may transmit the first PUSCH transmission occasion 320 using a first antenna panel 360, and the UE 120 may transmit the second PUSCH transmission occasion 330 using a second antenna panel 370. In other words, the UE 120 may form a first beam on the first antenna panel 360 and the UE 120 may form a second beam on the second antenna panel 370.

For a codebook-based MIMO, a transmitted precoding matrix indicator (TPMI) index per antenna panel may be identified by DCI, an uplink transmission configuration indicator (TCI) per antenna panel may be identified by DCI, and a sounding reference signal (SRS) set for codebook per panel may be radio resource control (RRC) configured. For non-codebook-based MIMO, an SRS resource indicator (SRI) index per antenna panel may be identified by DCI, an uplink TCI per antenna panel may be identified by DCI, and an SRS set for non-codebook per panel may be RRC configured. The uplink TCI is used to indicate a beam for the antenna panel, which can be a beam associated with the indicated reference signal ID. And the SRS set ID may be used to indicate the antenna panel ID, where each antenna panel is associated with an SRS set.

3GPP TS 38.213 Section 9 specifies that, if a UE transmits multiple PUSCH transmission occasions in a slot on respective serving cells and a PUCCH resource allocation overlaps the PUSCH resource allocations, the UE multiplexes UCI in the PUSCH transmission occasion with the smallest cell index. Section 9 further specifies that, if the UE transmits multiple PUSCH transmission occasions in the slot on the serving cell with the smallest cell index, the UE multiplexes the UCI in the earliest PUSCH transmission occasion that the UE transmits in the slot.

However, MIMO communication techniques may enable multiple panel ("multi-panel") transmissions in which a UE (e.g., the UE 120) transmits multiple PUSCH transmission occasions in a slot on a serving cell, using overlapping time resources such that there is not an earliest PUSCH transmission occasion in the slot, and such that the PUCCH transmission occasion carrying UCI also uses overlapping time resources. The 3GPP TS 38.213 does not address this situation.

In some aspects described herein, techniques are provided for selecting a PUSCH transmission occasion for multiplexing UCI, where multiple PUSCH transmission occasions share time and cell index resources. In this way, UCI may be reported during multi-panel simultaneous uplink transmissions, enabling more efficient use of time and frequency resources.

As indicated above, FIG. 3 is provided as an example. Other examples may differ from what is described with respect to FIG. 3.

Figure 4:
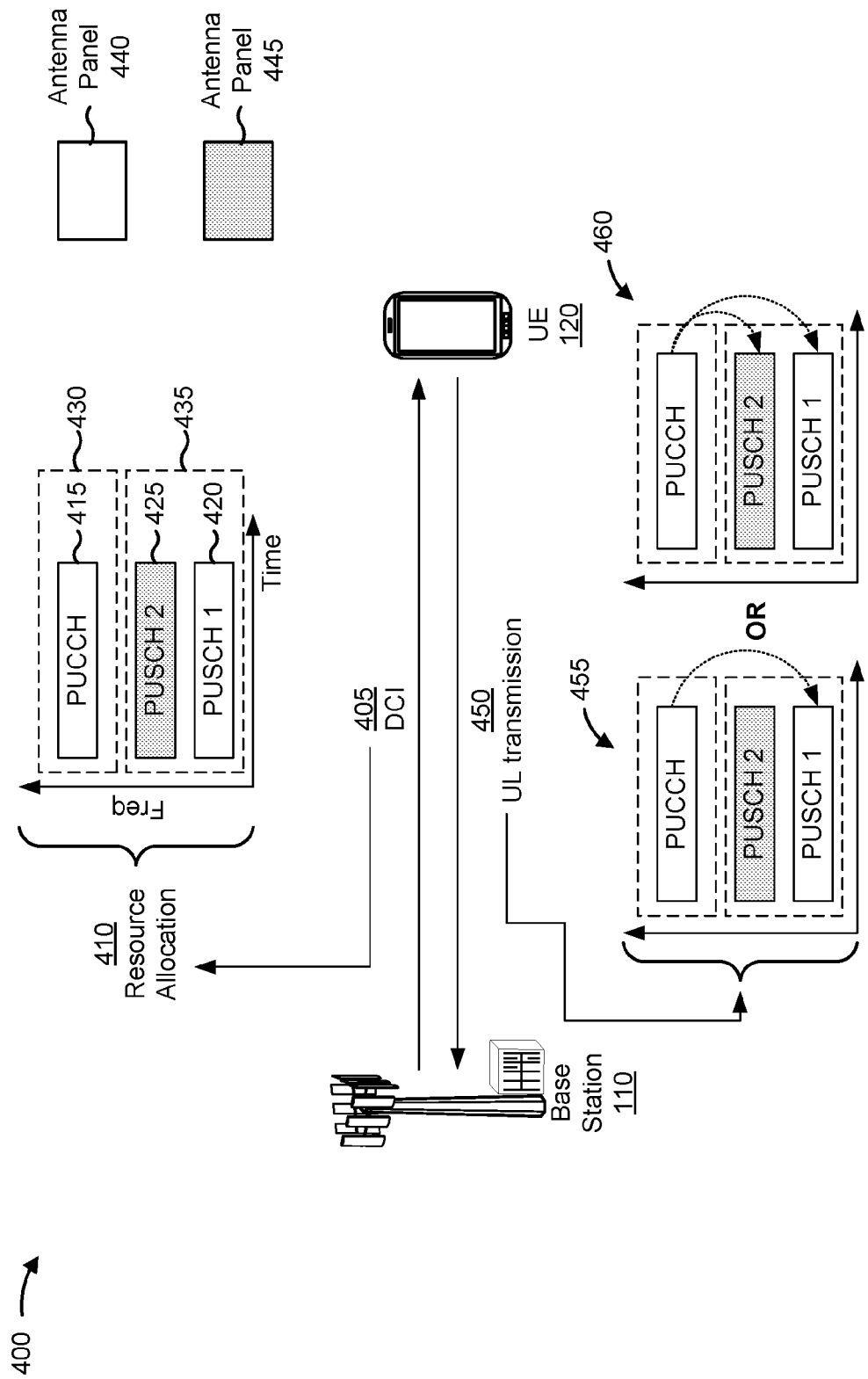
FIGS. 4-6 are diagrams illustrating examples of UCI multiplexing on PUSCH for multi-panel uplink transmission, in accordance with various aspects of the present disclosure.

FIG. 4 is a diagram illustrating an example 400 of UCI multiplexing on PUSCH for multi-panel uplink transmission, in accordance with various aspects of the present disclosure. As shown, a BS 110 and a UE 120 may communicate with one another.

As shown by reference number 405, the base station 110 may transmit, and the UE 120 may receive, DCI that includes a resource allocation 410 for an uplink communication. The UE 120 may determine that a resource allocation, for a physical uplink control channel (PUCCH) transmission occasion 415, indicates time domain resources that overlap time domain resources of a first resource allocation for a first PUSCH transmission occasion 420 (shown as PUSCH 1) and a second resource allocation for a second PUSCH transmission occasion 425 (shown as PUSCH 2). Indications of the resource allocations for the first and second PUSCH transmission occasions 420 and 425 may be transmitted in a single DCI transmission, multiple DCI transmissions, and/or the like.

The first resource allocation may indicate a first start time for the first PUSCH transmission occasion 420, and a first cell index for the first PUSCH transmission occasion 420. The second resource allocation may indicate a second start time for the second PUSCH transmission occasion 425 and a second cell index for the second PUSCH transmission occasion 425. As shown in FIG. 4, the first start time is the second start time, and the first cell index is the second cell index.

As shown, the PUCCH transmission occasion 415 may be scheduled for transmission in a first serving cell 430, and the PUSCH transmission occasions 420 and 425 may be scheduled for transmission in a second serving cell 435. The PUCCH transmission occasion 415 and the first PUSCH transmission occasion 420 may be scheduled for transmission using a first antenna panel 440. The second PUSCH transmission occasion 425 may be scheduled for transmission using a second antenna panel 445.

As shown by reference number 450, the UE 120 may transmit, and the BS 110 may receive, a multi-panel uplink (UL) transmission. The UE 120 may multiplex the first PUSCH transmission occasion 420 with the second PUSCH transmission occasion 425 using FDM. The UE 120 may multiplex UCI associated with the PUCCH transmission occasion 415 on a selected PUSCH transmission occasion. The selected PUSCH transmission occasion may include the first PUSCH transmission occasion 420, the second PUSCH transmission occasion 425, or a combination thereof.

As shown by reference number 455, for example, the selected PUSCH transmission occasion may include the first PUSCH transmission occasion 420. As shown in FIG. 4, the selected PUSCH transmission occasion may include a lowest frequency domain resource allocation index of a plurality of frequency domain resource allocation indexes associated with a plurality of PUSCH transmission occasions 420 and 425. The lowest frequency domain allocation index may include a lowest resource block (RB) index.

In some aspects, the selected PUSCH transmission occasion may include a lowest beam identifier of a plurality of beam identifiers associated with a plurality of PUSCH transmission occasions 420 and 425. The lowest beam identifier may include a lowest UL transmission configuration indicator (TCI) identifier (ID). In some aspects, the lowest beam identifier may include a lowest sounding reference signal (SRS) set ID.

In some aspects, the selected PUSCH transmission occasion may include a first transmitted precoding matrix indicator (TPMI) of a plurality of TPMIs associated with a plurality of PUSCH transmission occasions 420 and 425. The selected PUSCH transmission occasion may include a lowest SRS resource indicator (SRI) ID of a plurality of SRI IDs associated with a plurality of PUSCH transmission occasions 420 and 425. The selected PUSCH transmission occasion may correspond to a panel ID associated with the PUCCH transmission occasion 415.

As shown by reference number 460, in some aspects, the selected PUSCH transmission occasion may include the first PUSCH transmission occasion 420 and the second PUSCH transmission occasion 425.

As indicated above, FIG. 4 is provided as an example. Other examples may differ from what is described with respect to FIG. 4.

Figure 5:
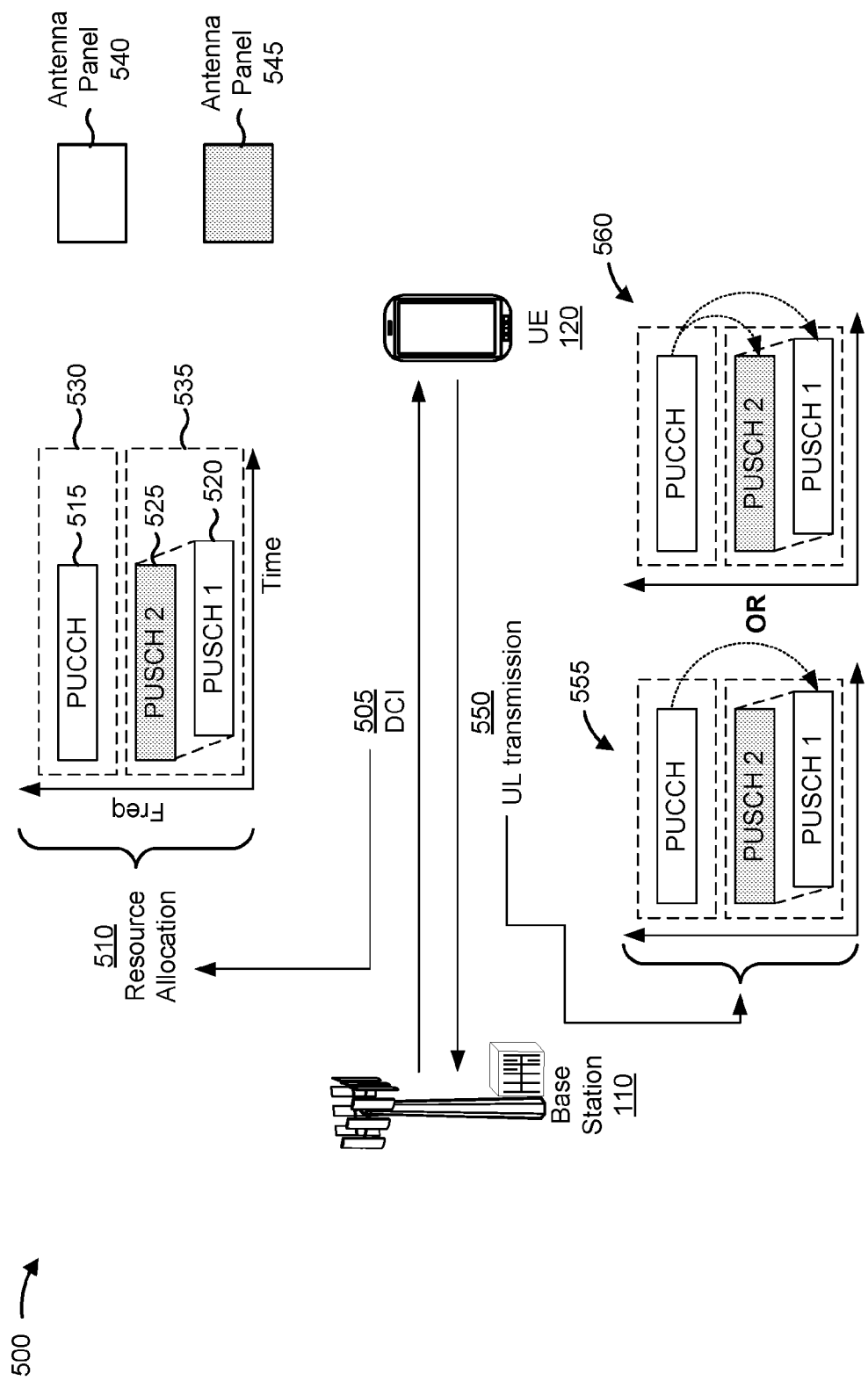

FIG. 5 is a diagram illustrating another example 500 of UCI multiplexing on PUSCH for multi-panel uplink transmission, in accordance with various aspects of the present disclosure. As shown, a BS 110 and a UE 120 may communicate with one another.

As shown by reference number 505, the base station 110 may transmit, and the UE 120 may receive, DCI that includes a resource allocation 510 for an uplink communication. The UE 120 may determine that a resource allocation, for a PUCCH transmission occasion 515, indicates time domain resources that overlap time domain resources of a first resource allocation for a first PUSCH transmission occasion 520 (shown as PUSCH 1) and a second resource allocation for a second PUSCH transmission occasion 525 (shown as PUSCH 2). Indications of the resource allocations for the first and second PUSCH transmission occasions 520 and 525 may be transmitted in a single DCI transmission, multiple DCI transmissions, and/or the like.

The first resource allocation may indicate a first start time for the first PUSCH transmission occasion 520, a first cell index for the first PUSCH transmission occasion 520, and a first frequency-domain resource allocation for the first PUSCH transmission occasion 520. The second resource allocation may indicate a second start time for the second PUSCH transmission occasion 525, a second cell index for the second PUSCH transmission occasion 525, and a second frequency-domain resource allocation for the second PUSCH transmission occasion 525. As shown in FIG. 5, the first start time is the second start time, the first cell index is the second cell index, and the first frequency-domain resource allocation is the second frequency-domain resource allocation.

As shown, the PUCCH transmission occasion 515 may be scheduled for transmission in a first serving cell 530, and the PUSCH transmission occasions 520 and 525 may be scheduled for transmission in a second serving cell 535. The PUCCH transmission occasion 515 and the first PUSCH transmission occasion 520 may be scheduled for transmission using a first antenna panel 540. The second PUSCH transmission occasion 525 may be scheduled for transmission using a second antenna panel 545.

As shown by reference number 550, the UE 120 may transmit, and the BS 110 may receive, a UL transmission. The UE 120 may multiplex the first PUSCH transmission occasion 520 with the second PUSCH transmission occasion 525 using SDM. The UE 120 may multiplex UCI associated with the PUCCH transmission occasion 515 on a selected PUSCH transmission occasion. The selected PUSCH transmission occasion may include the first PUSCH transmission occasion 520, the second PUSCH transmission occasion 525, or a combination thereof.

As shown by reference number 555, for example, the selected PUSCH transmission occasion may include the first PUSCH transmission occasion 520. As shown, the selected PUSCH transmission occasion 520 may correspond to a panel ID associated with the PUCCH transmission occasion 515.

In some aspects, the selected PUSCH transmission occasion may include a lowest beam identifier of a plurality of beam identifiers associated with a plurality of PUSCH transmission occasions 520 and 525. The lowest beam identifier may include a lowest UL TCI ID. In some aspects, the lowest beam identifier may include a lowest SRS ID. In some aspects, the selected PUSCH transmission occasion may include a first TPMI of a plurality of TPMIs associated with a plurality of PUSCH transmission occasions 520 and 525. The selected PUSCH transmission occasion may include a lowest SRI ID of a plurality of SRI IDs associated with a plurality of PUSCH transmission occasions 520 and 525.

In some aspects, the selected PUSCH transmission occasion may include a lowest demodulation reference signal (DMRS) code division multiplexing (CDM) group ID of a plurality of DMRS CDM group IDs associated with a plurality of PUSCH transmission occasions 520 and 525, where each PUSCH transmission occasion 520 and 525 is associated with at least one DMRS CDM group, and different PUSCH transmission occasions 520 and 525 may be associated with different DMRS CDM groups. In some aspects, the selected PUSCH transmission occasion may include a lowest DMRS port ID of a plurality of DMRS port IDs associated with a plurality of PUSCH transmission occasions 520 and 525.

As shown by reference number 560, in some aspects, the selected PUSCH transmission occasion may include the first PUSCH transmission occasion 520 and the second PUSCH transmission occasion 525.

As indicated above, FIG. 5 is provided as an example. Other examples may differ from what is described with respect to FIG. 5.

Figure 6:
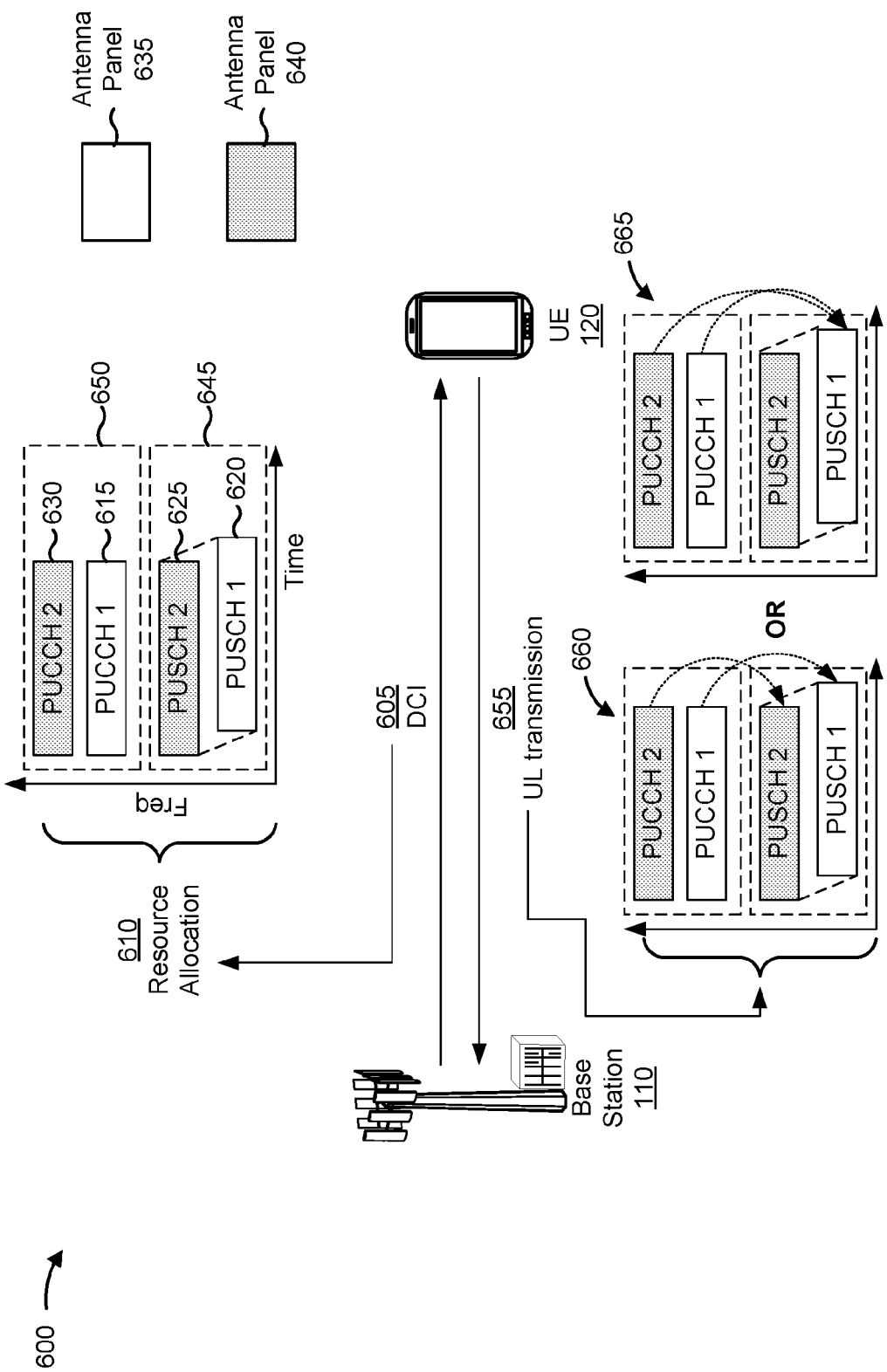

FIG. 6 is a diagram illustrating another example 600 of UCI multiplexing on PUSCH for multi-panel uplink transmission, in accordance with various aspects of the present disclosure. As shown, a BS 110 and a UE 120 may communicate with one another.

As shown by reference number 605, the base station 110 may transmit, and the UE 120 may receive, DCI that includes a resource allocation 610 for a UL communication. The UE 120 may determine that a resource allocation, for a PUCCH transmission occasion 615 (shown as PUCCH 1), indicates time domain resources that overlap time domain resources of a first resource allocation for a first PUSCH transmission occasion 620 (shown as PUSCH 1) and a second resource allocation for a second PUSCH transmission occasion 625 (shown as PUSCH 2). The UE 120 may determine that another resource allocation, for another PUCCH transmission occasion 630 (shown as PUCCH 2), indicates time domain resources that overlap time domain resources of the resource allocation 610. As shown, the PUCCH transmission occasion 615 may correspond to a first antenna panel 635 and the other PUCCH transmission occasion 630 may correspond to a second antenna panel 640.

As shown in FIG. 6, the resource allocation 610 may indicate a shared start time for the first PUSCH transmission occasion 620 and the second PUSCH transmission occasion 625, a shared cell index 645 for the first PUSCH transmission occasion 620 and the second PUSCH transmission occasion 625, and a shared frequency-domain resource allocation for the first PUSCH transmission occasion 620 and the second PUSCH transmission occasion 625. As shown, the PUCCH transmission occasions 615 and 630 may share a start time and a cell index 650.

As shown by reference number 655, the UE 120 may transmit, and the BS 110 may receive, a UL transmission. The UE 120 may multiplex the first PUSCH transmission occasion 620 with the second PUSCH transmission occasion 625 using SDM. The UE 120 may multiplex UCI associated with the PUCCH transmission occasions 615 and 630 on one or more selected PUSCH transmission occasions. The selected PUSCH transmission occasion(s) may include the first PUSCH transmission occasion 620, the second PUSCH transmission occasion 625, or a combination thereof.

As shown by reference number 660, for example, the selected PUSCH transmission occasion for each PUCCH transmission occasion 615 and 630 may include PUSCH transmission occasions with the same panel ID as the corresponding PUCCH transmission occasion. The UCI associated with the PUCCH transmission occasion 615, which corresponds to the first antenna panel 635, is multiplexed on the first PUSCH transmission occasion 620, which also corresponds to the first antenna panel 635. Similarly, the UCI associated with the PUCCH transmission occasion 630, which corresponds to the second antenna panel 640, is multiplexed on the second PUSCH transmission occasion 625, which also corresponds to the second antenna panel 640. In some aspects, the PUCCH transmission occasions 615 and 630 may be multiplexed with the respective PUSCH transmission occasions 620 and 625 before the PUSCH transmission occasions 620 and 625 are multiplexed with one another.

As shown by reference number 665, in some aspects, the selected PUSCH transmission occasion may include a PUSCH transmission occasion selected according to the selection criteria described above in connection with FIG. 5, regardless of antenna panel ID.

As indicated above, FIG. 6 is provided as an example. Other examples may differ from what is described with respect to FIG. 6.

Figure 7:
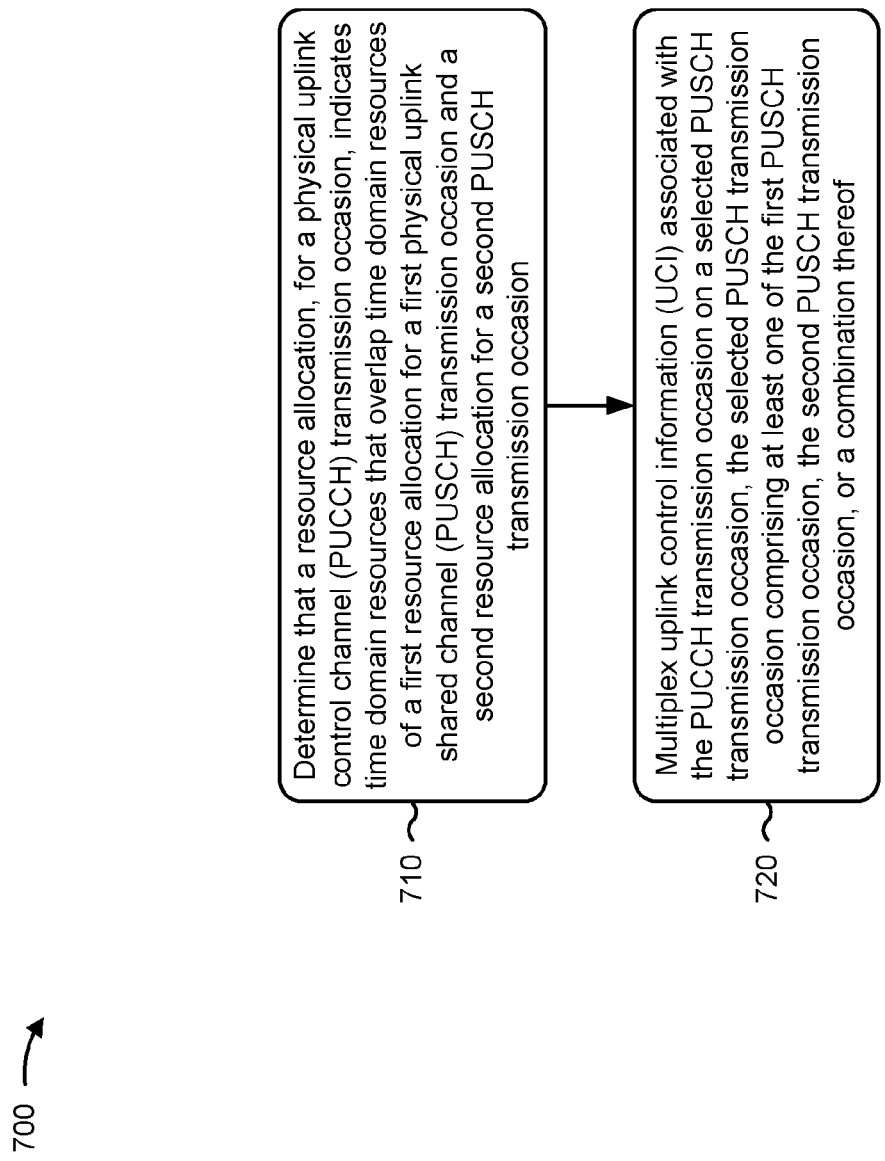
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with UCI multiplexing on PUSCH for multi-panel uplink transmission.

As shown in FIG. 7, in some aspects, process 700 may include determining that a resource allocation, for a PUCCH transmission occasion, indicates time domain resources that overlap time domain resources of a first resource allocation for a first PUSCH transmission occasion and a second resource allocation for a second PUSCH transmission occasion (block 710). For example, the UE (e.g., using receive processor 258, controller/processor 280, memory 282, and/or the like) may determine that a resource allocation, for a PUCCH transmission occasion, indicates time domain resources that overlap time domain resources of a first resource allocation for a first PUSCH transmission occasion and a second resource allocation for a second PUSCH transmission occasion, as described above.

As further shown in FIG. 7, in some aspects, process 700 may include multiplexing UCI associated with the PUCCH transmission occasion on a selected PUSCH transmission occasion, the selected PUSCH transmission occasion comprising at least one of the first PUSCH transmission occasion, the second PUSCH transmission occasion, or a combination thereof (block 720). For example, the UE (e.g., using transmit processor 264, controller/processor 280, memory 282, and/or the like) may multiplex UCI associated with the PUCCH transmission occasion on a selected PUSCH transmission occasion, the selected PUSCH transmission occasion comprising at least one of the first PUSCH transmission occasion, the second PUSCH transmission occasion, or a combination thereof, as described above.

Process 700 may include additional aspects, such as any single aspect or any combination of aspects described below and/or in connection with one or more other processes described elsewhere herein.

In a first aspect, the first resource allocation indicates a first start time for the first PUSCH transmission occasion, and a first cell index for the first PUSCH transmission occasion, and the second resource allocation indicates a second start time for the second PUSCH transmission occasion and a second cell index for the second PUSCH transmission occasion, where the first start time is the second start time, and the first cell index is the second cell index.

In a second aspect, alone or in combination with the first aspect, the selected PUSCH transmission occasion comprises a lowest frequency domain resource allocation index of a plurality of frequency domain resource allocation indexes associated with a plurality of PUSCH transmission occasions, the plurality of PUSCH transmission occasions including the first PUSCH transmission occasion and the second PUSCH transmission occasion.

In a third aspect, alone or in combination with one or more of the first and second aspects, the lowest frequency domain allocation index comprises a lowest RB index.

In a fourth aspect, alone or in combination with one or more of the first through third aspects, the selected PUSCH transmission occasion comprises a lowest beam identifier of a plurality of beam identifiers associated with a plurality of PUSCH transmission occasions, the plurality of PUSCH transmission occasions including the first PUSCH transmission occasion and the second PUSCH transmission occasion.

In a fifth aspect, alone or in combination with one or more of the first through fourth aspects, the lowest beam identifier comprises a lowest UL TCI ID.

In a sixth aspect, alone or in combination with one or more of the first through fifth aspects, the lowest beam identifier comprises a lowest SRS set ID.

In a seventh aspect, alone or in combination with one or more of the first through sixth aspects, the selected PUSCH transmission occasion comprises a first TPMI of a plurality of TPMIs associated with a plurality of PUSCH transmission occasions, the plurality of PUSCH transmission occasions including the first PUSCH transmission occasion and the second PUSCH transmission occasion.

In an eighth aspect, alone or in combination with one or more of the first through seventh aspects, the selected PUSCH transmission occasion comprises a lowest SRI ID of a plurality of SRI IDs associated with a plurality of PUSCH transmission occasions, the plurality of PUSCH transmission occasions including the first PUSCH transmission occasion and the second PUSCH transmission occasion.

In a ninth aspect, alone or in combination with one or more of the first through eighth aspects, the selected PUSCH transmission occasion corresponds to a panel ID associated with the PUCCH transmission occasion.

In a tenth aspect, alone or in combination with one or more of the first through ninth aspects, the selected PUSCH transmission occasion comprises a lowest DMRS CDM group ID of a plurality of DMRS CDM group IDs associated with a plurality of PUSCH transmission occasions, the plurality of PUSCH transmission occasions including the first PUSCH transmission occasion and the second PUSCH transmission occasion.

In an eleventh aspect, alone or in combination with one or more of the first through tenth aspects, the selected PUSCH transmission occasion comprises a lowest DMRS port ID of a plurality of DMRS port IDs associated with a plurality of PUSCH transmission occasions, the plurality of PUSCH transmission occasions including the first PUSCH transmission occasion and the second PUSCH transmission occasion.

In a twelfth aspect, alone or in combination with one or more of the first through eleventh aspects, process 700 includes multiplexing the first PUSCH transmission occasion with the second PUSCH transmission occasion using FDM.

In a thirteenth aspect, alone or in combination with one or more of the first through twelfth aspects, the selected PUSCH transmission occasion comprises a lowest frequency domain resource allocation index of a plurality of frequency domain resource allocation indexes associated with a plurality of PUSCH transmission occasions, the plurality of PUSCH transmission occasions including the first PUSCH transmission occasion and the second PUSCH transmission occasion.

In a fourteenth aspect, alone or in combination with one or more of the first through thirteenth aspects, the lowest frequency domain allocation index comprises a lowest RB index.

In a fifteenth aspect, alone or in combination with one or more of the first through fourteenth aspects, the selected PUSCH transmission occasion comprises a lowest beam identifier of a plurality of beam identifiers associated with a plurality of PUSCH transmission occasions, the plurality of PUSCH transmission occasions including the first PUSCH transmission occasion and the second PUSCH transmission occasion.

In a sixteenth aspect, alone or in combination with one or more of the first through fifteenth aspects, the lowest beam identifier comprises a lowest UL TCI ID.

In a seventeenth aspect, alone or in combination with one or more of the first through sixteenth aspects, the lowest beam identifier comprises a lowest SRS set ID.

In an eighteenth aspect, alone or in combination with one or more of the first through seventeenth aspects, the selected PUSCH transmission occasion comprises a first TPMI of a plurality of TPMIs associated with a plurality of PUSCH transmission occasions, the plurality of PUSCH transmission occasions including the first PUSCH transmission occasion and the second PUSCH transmission occasion.

In a nineteenth aspect, alone or in combination with one or more of the first through eighteenth aspects, the selected PUSCH transmission occasion comprises a lowest SRI ID of a plurality of SRI IDs associated with a plurality of PUSCH transmission occasions, the plurality of PUSCH transmission occasions including the first PUSCH transmission occasion and the second PUSCH transmission occasion.

In a twentieth aspect, alone or in combination with one or more of the first through nineteenth aspects, the selected PUSCH transmission occasion corresponds to a panel ID associated with the PUCCH transmission occasion.

In a twenty-first aspect, alone or in combination with one or more of the first through twentieth aspects, process 700 includes multiplexing the first PUSCH transmission occasion with the second PUSCH transmission occasion using SDM.

In a twenty-second aspect, alone or in combination with one or more of the first through twenty-first aspects, the selected PUSCH transmission occasion comprises a lowest beam identifier of a plurality of beam identifiers associated with a plurality of PUSCH transmission occasions, the plurality of PUSCH transmission occasions including the first PUSCH transmission occasion and the second PUSCH transmission occasion.

In a twenty-third aspect, alone or in combination with one or more of the first through twenty-second aspects, the lowest beam identifier comprises a lowest UL TCI ID.

In a twenty-fourth aspect, alone or in combination with one or more of the first through twenty-third aspects, the lowest beam identifier comprises a lowest SRS set ID.

In a twenty-fifth aspect, alone or in combination with one or more of the first through twenty-fourth aspects, the selected PUSCH transmission occasion comprises a first TPMI of a plurality of TPMIs associated with a plurality of PUSCH transmission occasions, the plurality of PUSCH transmission occasions including the first PUSCH transmission occasion and the second PUSCH transmission occasion.

In a twenty-sixth aspect, alone or in combination with one or more of the first through twenty-fifth aspects, the selected PUSCH transmission occasion comprises a lowest SRI ID of a plurality of SRI IDs associated with a plurality of PUSCH transmission occasions, the plurality of PUSCH transmission occasions including the first PUSCH transmission occasion and the second PUSCH transmission occasion.

In a twenty-seventh aspect, alone or in combination with one or more of the first through twenty-sixth aspects, the selected PUSCH transmission occasion comprises a lowest DMRS CDM group ID of a plurality of DMRS CDM group IDs associated with a plurality of PUSCH transmission occasions, the plurality of PUSCH transmission occasions including the first PUSCH transmission occasion and the second PUSCH transmission occasion.

In a twenty-eighth aspect, alone or in combination with one or more of the first through twenty-seventh aspects, the selected PUSCH transmission occasion comprises a lowest DMRS port ID of a plurality of DMRS port IDs associated with a plurality of PUSCH transmission occasions, the plurality of PUSCH transmission occasions including the first PUSCH transmission occasion and the second PUSCH transmission occasion.

In a twenty-ninth aspect, alone or in combination with one or more of the first through twenty-eighth aspects, the selected PUSCH transmission occasion corresponds to a panel ID associated with the PUCCH transmission occasion.

In a thirtieth aspect, alone or in combination with one or more of the first through twenty-ninth aspects, process 700 includes determining that another resource allocation, for another PUCCH transmission occasion, indicates time domain resources that overlap time domain resources of the resource allocation, wherein the PUCCH transmission occasion corresponds to a first panel and the other PUCCH transmission occasion corresponds to a second panel, and the selected PUSCH transmission occasion corresponds to the first panel; and multiplexing UCI associated with the other PUCCH transmission occasion on another selected PUSCH occasion, the other selected PUSCH occasion corresponding to the second panel.

In a thirty-first aspect, alone or in combination with one or more of the first through thirtieth aspects, process 700 includes determining that another resource allocation, for another PUCCH transmission occasion, indicates time domain resources that overlap time domain resources of the resource allocation, wherein the PUCCH transmission occasion corresponds to a first panel and the other PUCCH transmission occasion corresponds to a second panel; and multiplexing UCI associated with the other PUCCH transmission occasion on the selected PUSCH transmission occasion, wherein the selected PUSCH transmission occasion corresponds to the first panel, the second panel, or a third panel.

In a thirty-second aspect, alone or in combination with one or more of the first through thirty-first aspects, an indication of the first resource allocation is received in a first DCI transmission, and an indication of the second resource allocation is received in a second DCI transmission.

In a thirty-third aspect, alone or in combination with one or more of the first through thirty-second aspects, the first DCI transmission is the second DCI transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of a list of" items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that a resource allocation, for a physical uplink control channel (PUCCH) transmission occasion, indicates time domain resources that overlap time domain resources of a first resource allocation for a first physical uplink shared channel (PUSCH) transmission occasion and a second resource allocation for a second PUSCH transmission occasion; and
    multiplexing uplink control information (UCI) associated with the PUCCH transmission occasion on a selected PUSCH transmission occasion, the selected PUSCH transmission occasion comprising at least one of the first PUSCH transmission occasion, the second PUSCH transmission occasion, or a combination thereof, wherein one or more of the selected PUSCH transmission occasion comprises a lowest sounding reference signal (SRS) set identifier (ID) or the selected PUSCH transmission occasion corresponds to a panel identifier (ID) associated with the PUCCH transmission occasion.

2. The method of claim 1, wherein the first resource allocation indicates a first start time for the first PUSCH transmission occasion, and a first cell index for the first PUSCH transmission occasion, and wherein the second resource allocation indicates a second start time for the second PUSCH transmission occasion and a second cell index for the second PUSCH transmission occasion, wherein the first start time is the second start time, and wherein the first cell index is the second cell index.

3. The method of claim 1, wherein the selected PUSCH transmission occasion comprises a lowest frequency domain resource allocation index of a plurality of frequency domain resource allocation indexes associated with a plurality of PUSCH transmission occasions, the plurality of PUSCH transmission occasions including the first PUSCH transmission occasion and the second PUSCH transmission occasion.

4. The method of claim 3, wherein the lowest frequency domain resource allocation index comprises a lowest resource block (RB) index.

5. The method of claim 1, wherein the selected PUSCH transmission occasion comprises a lowest beam identifier of a plurality of beam identifiers associated with a plurality of PUSCH transmission occasions, the plurality of PUSCH transmission occasions including the first PUSCH transmission occasion and the second PUSCH transmission occasion.

6. The method of claim 5, wherein the lowest beam identifier comprises a lowest uplink (UL) transmission configuration indicator (TCI) identifier (ID).

7. The method of claim 5, wherein the lowest beam identifier comprises the lowest SRS set ID.

8. The method of claim 1, wherein the selected PUSCH transmission occasion comprises a first transmitted precoding matrix indicator (TPMI) of a plurality of TPMIs associated with a plurality of PUSCH transmission occasions, the plurality of PUSCH transmission occasions including the first PUSCH transmission occasion and the second PUSCH transmission occasion.

9. The method of claim 1, wherein the selected PUSCH transmission occasion comprises a lowest SRS resource indicator (SRI) identifier (ID) of a plurality of SRI IDs, wherein the plurality of SRI IDs are associated with a plurality of PUSCH transmission occasions, the plurality of PUSCH transmission occasions including the first PUSCH transmission occasion and the second PUSCH transmission occasion.

10. The method of claim 1, wherein the selected PUSCH transmission occasion corresponds to the panel ID associated with the PUCCH transmission occasion.

11. The method of claim 1, wherein the selected PUSCH transmission occasion comprises a lowest demodulation reference signal (DMRS) code division multiplexing (CDM) group identifier (ID) of a plurality of DMRS CDM group IDs associated with a plurality of PUSCH transmission occasions, the plurality of PUSCH transmission occasions including the first PUSCH transmission occasion and the second PUSCH transmission occasion.

12. The method of claim 1, wherein the selected PUSCH transmission occasion comprises a lowest demodulation reference signal (DMRS) port identifier (ID) of a plurality of DMRS port IDs associated with a plurality of PUSCH transmission occasions, the plurality of PUSCH transmission occasions including the first PUSCH transmission occasion and the second PUSCH transmission occasion.

13. The method of claim 1, further comprising multiplexing the first PUSCH transmission occasion with the second PUSCH transmission occasion using frequency division multiplexing (FDM).

14. The method of claim 13, wherein the selected PUSCH transmission occasion comprises a lowest frequency domain resource allocation index of a plurality of frequency domain resource allocation indexes associated with a plurality of PUSCH transmission occasions, the plurality of PUSCH transmission occasions including the first PUSCH transmission occasion and the second PUSCH transmission occasion.

15. The method of claim 14, wherein the lowest frequency domain resource allocation index comprises a lowest resource block (RB) index.

16. The method of claim 13, wherein the selected PUSCH transmission occasion comprises a lowest beam identifier of a plurality of beam identifiers associated with a plurality of PUSCH transmission occasions, the plurality of PUSCH transmission occasions including the first PUSCH transmission occasion and the second PUSCH transmission occasion.

17. The method of claim 16, wherein the lowest beam identifier comprises a lowest uplink (UL) transmission configuration indicator (TCI) identifier (ID).

18. The method of claim 16, wherein the lowest beam identifier comprises the lowest SRS set ID.

19. The method of claim 13, wherein the selected PUSCH transmission occasion comprises a first transmitted precoding matrix indicator (TPMI) of a plurality of TPMIs associated with a plurality of PUSCH transmission occasions, the plurality of PUSCH transmission occasions including the first PUSCH transmission occasion and the second PUSCH transmission occasion.

20. The method of claim 13, wherein the selected PUSCH transmission occasion comprises a lowest SRS resource indicator (SRI) identifier (ID) of a plurality of SRI IDs, wherein the plurality of SRI IDs are associated with a plurality of PUSCH transmission occasions, the plurality of PUSCH transmission occasions including the first PUSCH transmission occasion and the second PUSCH transmission occasion.

21. The method of claim 13, wherein the selected PUSCH transmission occasion corresponds to the panel ID associated with the PUCCH transmission occasion.

22. The method of claim 1, further comprising multiplexing the first PUSCH transmission occasion with the second PUSCH transmission occasion using space division multiplexing (SDM).

23. The method of claim 22, wherein the selected PUSCH transmission occasion comprises a lowest beam identifier of a plurality of beam identifiers associated with a plurality of PUSCH transmission occasions, the plurality of PUSCH transmission occasions including the first PUSCH transmission occasion and the second PUSCH transmission occasion.

24. The method of claim 23, wherein the lowest beam identifier comprises a lowest uplink (UL) transmission configuration indicator (TCI) identifier (ID).

25. The method of claim 23, wherein the lowest beam identifier comprises the lowest SRS set ID.

26. The method of claim 22, wherein the selected PUSCH transmission occasion comprises a first transmitted precoding matrix indicator (TPMI) of a plurality of TPMIs associated with a plurality of PUSCH transmission occasions, the plurality of PUSCH transmission occasions including the first PUSCH transmission occasion and the second PUSCH transmission occasion.

27. The method of claim 22, wherein the selected PUSCH transmission occasion comprises a lowest SRS resource indicator (SRI) identifier (ID) of a plurality of SRI IDs, wherein the plurality of SRI IDs are associated with a plurality of PUSCH transmission occasions, the plurality of PUSCH transmission occasions including the first PUSCH transmission occasion and the second PUSCH transmission occasion.

28. The method of claim 22, wherein the selected PUSCH transmission occasion comprises a lowest demodulation reference signal (DMRS) code division multiplexing (CDM) group identifier (ID) of a plurality of DMRS CDM group IDs associated with a plurality of PUSCH transmission occasions, the plurality of PUSCH transmission occasions including the first PUSCH transmission occasion and the second PUSCH transmission occasion.

29. The method of claim 22, wherein the selected PUSCH transmission occasion comprises a lowest demodulation reference signal (DMRS) port identifier (ID) of a plurality of DMRS port IDs associated with a plurality of PUSCH transmission occasions, the plurality of PUSCH transmission occasions including the first PUSCH transmission occasion and the second PUSCH transmission occasion.

30. The method of claim 22, wherein the selected PUSCH transmission occasion corresponds to the panel ID associated with the PUCCH transmission occasion.

31. The method of claim 1, further comprising:
determining that another resource allocation, for another PUCCH transmission occasion, indicates time domain resources that overlap time domain resources of the resource allocation, wherein the PUCCH transmission occasion corresponds to a first panel and the other PUCCH transmission occasion corresponds to a second panel, and the selected PUSCH transmission occasion corresponds to the first panel; and
multiplexing UCI associated with the other PUCCH transmission occasion on another selected PUSCH occasion, the other selected PUSCH occasion corresponding to the second panel.

32. The method of claim 1, further comprising:
determining that another resource allocation, for another PUCCH transmission occasion, indicates time domain resources that overlap time domain resources of the resource allocation, wherein the PUCCH transmission occasion corresponds to a first panel and the other PUCCH transmission occasion corresponds to a second panel; and
multiplexing UCI associated with the other PUCCH transmission occasion on the selected PUSCH transmission occasion, wherein the selected PUSCH transmission occasion corresponds to the first panel, the second panel, or a third panel.

33. The method of claim 1, wherein an indication of the first resource allocation is received in a first downlink control information (DCI) transmission, and wherein an indication of the second resource allocation is received in a second DCI transmission.

34. The method of claim 33, wherein the first DCI transmission is the second DCI transmission.

35. A user equipment (UE) for wireless communication, comprising:
one or more memories; and
one or more processors coupled to the one or more memories, the one or more memories and the one or more processors configured to:

determine that a resource allocation, for a physical uplink control channel (PUCCH) transmission occasion, indicates time domain resources that overlap time domain resources of a first resource allocation for a first physical uplink shared channel (PUSCH) transmission occasion and a second resource allocation for a second PUSCH transmission occasion; and multiplex uplink control information (UCI) associated with the PUCCH transmission occasion on a selected PUSCH transmission occasion, the selected PUSCH transmission occasion comprising at least one of the first PUSCH transmission occasion, the second PUSCH transmission occasion, or a combination thereof, wherein one or more of the selected PUSCH transmission occasion comprises a lowest sounding reference signal (SRS) set identifier (ID) or the selected PUSCH transmission occasion corresponds to a panel identifier (ID) associated with the PUCCH transmission occasion.

36. A non-transitory computer-readable medium storing one or more instructions for wireless communication, the one or more instructions comprising:

one or more instructions that, when executed by one or more processors of a user equipment (UE), cause the one or more processors to:

determine that a resource allocation, for a physical uplink control channel (PUCCH) transmission occasion, indicates time domain resources that overlap time domain resources of a first resource allocation for a first physical uplink shared channel (PUSCH) transmission occasion and a second resource allocation for a second PUSCH transmission occasion; and multiplex uplink control information (UCI) associated with the PUCCH transmission occasion on a selected PUSCH transmission occasion, the selected PUSCH transmission occasion comprising at least one of the first PUSCH transmission occasion, the second PUSCH transmission occasion, or a combination thereof, wherein one or more of the selected PUSCH transmission occasion comprises a lowest sounding reference signal (SRS) set identifier (ID) or the selected PUSCH transmission occasion corresponds to a panel identifier (ID) associated with the PUCCH transmission occasion.

37. An apparatus for wireless communication, comprising:

means for determining that a resource allocation, for a physical uplink control channel (PUCCH) transmission occasion, indicates time domain resources that overlap time domain resources of a first resource allocation for a first physical uplink shared channel (PUSCH) transmission occasion and a second resource allocation for a second PUSCH transmission occasion; and means for multiplexing uplink control information (UCI) associated with the PUCCH transmission occasion on a selected PUSCH transmission occasion, the selected PUSCH transmission occasion comprising at least one of the first PUSCH transmission occasion, the second PUSCH transmission occasion, or a combination thereof, wherein one or more of the selected PUSCH transmission occasion comprises a lowest sounding reference signal (SRS) set identifier (ID) or the selected PUSCH transmission occasion corresponds to a panel identifier (ID) associated with the PUCCH transmission occasion.

* * * * *